United States Patent
Glime et al.

[11] Patent Number: 5,685,682
[45] Date of Patent: Nov. 11, 1997

[54] SNAP-FIT FASTENER DEVICE WITH FIRST AND SECOND MATERIALS

[75] Inventors: Patricia Ann Glime; Ronald Lee Beckmann, both of Rochester, Mich.

[73] Assignee: General Motors Corporation, Detroit, Mich.

[21] Appl. No.: 673,637

[22] Filed: Jun. 26, 1996

[51] Int. Cl.$^6$ ............................................. F16B 19/00
[52] U.S. Cl. ................... 411/510; 411/900; 411/907; 411/913
[58] Field of Search ........................ 411/392, 508, 411/509, 510, 901, 902, 907, 913, 900

[56] References Cited

U.S. PATENT DOCUMENTS

| | | |
|---|---|---|
| D. 293,880 | 1/1988 | Takahashi . |
| 2,859,651 | 11/1958 | Horovitz . |
| 3,902,215 | 9/1975 | Waldrop et al. . |
| 4,420,859 | 12/1983 | Hammerle . |
| 4,454,699 | 6/1984 | Strobl . |
| 4,963,051 | 10/1990 | Hutter .................... 411/510 X |
| 5,017,182 | 5/1991 | Mabie . |
| 5,061,137 | 10/1991 | Gourd ........................ 411/510 |
| 5,104,271 | 4/1992 | Lechler .................... 411/392 X |

FOREIGN PATENT DOCUMENTS

| | | | |
|---|---|---|---|
| 1134337 | 8/1962 | Germany | 411/392 |

*Primary Examiner*—Neill R. Wilson
*Attorney, Agent, or Firm*—Kathryn A. Marra

[57] ABSTRACT

A fastener device is provided for connecting a first component having a first aperture therein to a second component having a second aperture therein. The fastener device includes an axially extending first shaft portion for connection within the first aperture of the first component and an axially extending second shaft portion for connection within the second aperture of the second component. A connector portion extends between and interconnects the first and second shaft portions to each other. The shaft portions are each made of a first material and the connector portion is made of a different second material. The second material forming the connector portion is sufficiently flexible to permit axial and transverse movement of the first and second shaft portions relative each to allow for coaxial misalignment of the first and second apertures and to provide noise and vibration isolation between the first and second components in the assembled condition.

4 Claims, 1 Drawing Sheet

: 
SNAP-FIT FASTENER DEVICE WITH FIRST AND SECOND MATERIALS

This invention relates to a fastener device that can be used to connect two components together while isolating noise and vibration from one component to the other.

BACKGROUND OF THE INVENTION

It is known in the prior art to provide fasteners for connecting together two components. One such fastener device includes a double-headed Christmas-tree type fastener which includes upper and lower shafts having a plurality of thin fins on each of the shafts for snap-fitted engagement into axially aligned apertures on each of the two components being joined together. The fastener device of the prior art is integrally molded of a single continuous rigid material with a wider, cylindrical central portion positioned between the two shafts. Thus, the central portion acts as a spacer between the two components and provides a rigid connection between the two shafts and does not allow for movement of the first and second shafts relative each other. In addition, since the upper and lower shaft portions and the central portion are integrally formed of the same relatively rigid material, noise and vibration is readily transmitted between the two components when joined together by the fastener.

SUMMARY OF THE INVENTION

The present invention provides alternatives and advantages over the prior art by providing a fastener device that connects two components together by snap-fitted connection with coaxially aligned apertures in each of the components. Advantageously, the fastener device can be used to join the two components together even when the apertures are coaxially misaligned. Also advantageously, the fastener device connects the two components together and also acts as a damper and isolator such that the transmission of noise and vibration from one component to the other is greatly reduced by the fastener device. Also advantageously, the fastener device provides isolation in a single fastening device without requiring a separate grommet or bushing for a reduction in the number of parts.

These advantages are accomplished in a preferred form of the invention by providing a fastener device for connecting a first component having a first aperture therein to a second component having a second aperture therein. The fastener device includes an axially extending first shaft portion for connection within the first aperture of the first component and an axially extending second shaft portion for connection within the second aperture of the second component. The second shaft portion is formed separate and independent from the first shaft portion. A connector portion extends between and interconnects the first and second shaft portions to each other. The connector portion is positioned between the first and second components when the shaft portions are connected to the first and second components. The shaft portions are each made of a first material and the connector portion is made of a different second material.

Advantageously, the second material is less stiff than the first material and the connector portion being made of the second material is sufficiently flexible to permit axial and transverse movement of the first and second shaft portions relative each other.

In another preferred form, the second material is less stiff than the first material such that the connector portion is deformable. The first and second shaft portions are coaxially aligned when the connector portion is an undeformed condition and the first and second apertures are coaxially aligned. Also advantageously, the first and second shaft portions may be coaxially misaligned when the connector portion is in a deformed condition to allow connection of the first and second components by the fastener device even when the first and second apertures are coaxially misaligned.

Advantageously, the second material forming the connector portion is sufficiently flexible to permit axial and transverse movement of the first and second shaft portions relative to each other to allow for coaxial misalignment of the first and second apertures and to provide noise and vibration isolation between the first and second components in the assembled condition.

Preferably, the shaft portions each include a radially outwardly projecting base portion having an inner base surface and an outer base surface. The base portions are preferably sized larger than the apertures such that the outer base surfaces of the base portions act as stop surfaces when the shaft portions are inserted through the apertures. Also, the connector portion extends between and interconnects the inner base surfaces of the shaft portions.

BRIEF DESCRIPTION OF THE DRAWINGS

An embodiment of the present invention is described, by way of example only, with reference to the accompanying drawings in which.

DESCRIPTION OF THE PREFERRED EMBODIMENT

Figure 1:
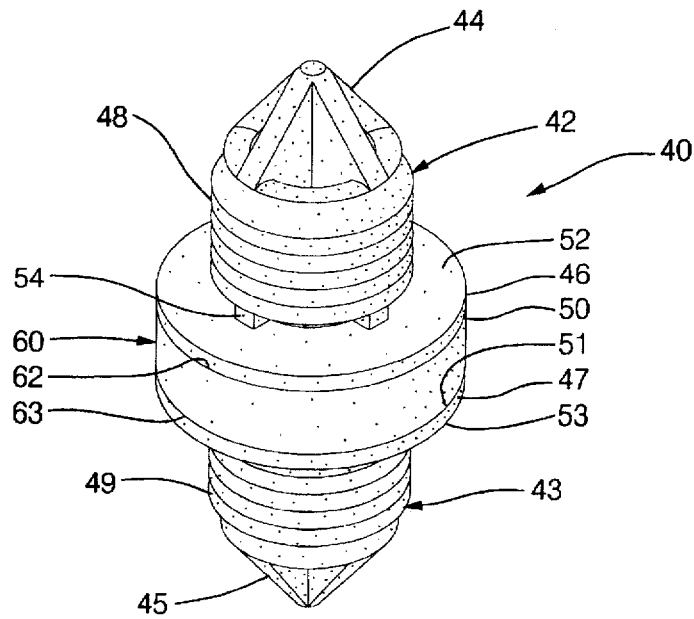
FIG. 1 is a perspective view of the fastener device according to the present invention.
Figures 2, 3:
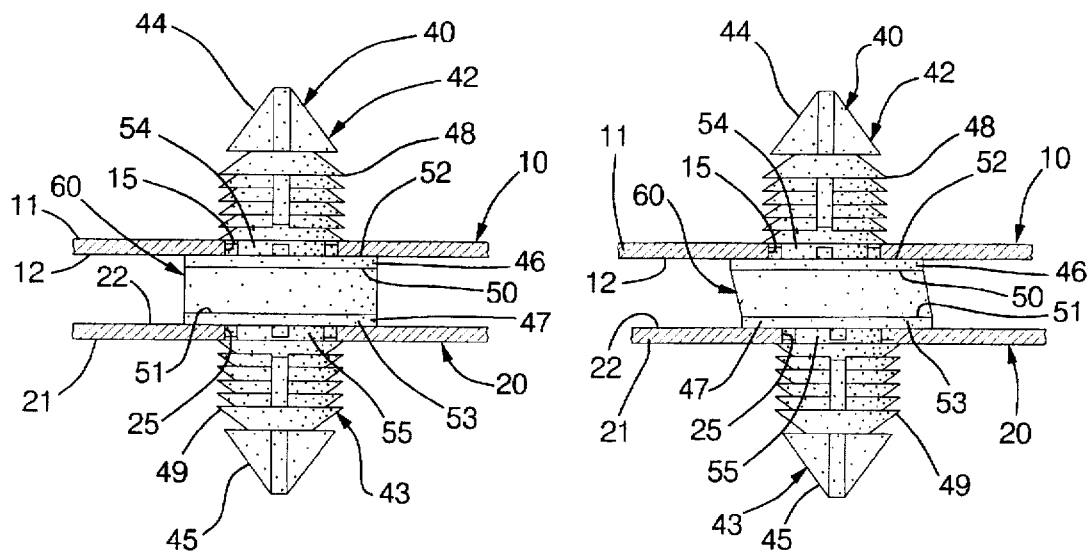
FIG. 2 is a side view of the fastener device with a cross-sectional view of first and second components which are being joined together and the components having apertures which are coaxially aligned.
FIG. 3 is a side view similar to FIG. 2, but showing the first and second components having apertures which are coaxially misaligned.

Referring to FIGS. 2 and 3, a fastener device 40 joins together a first component 10 and a second component 20. For example, the first component 10 could be an air cleaner assembly in a vehicle and the second component 20 could be a mounting bracket on the vehicle. However, it is contemplated that numerous other types of components may be joined together by the fastener device 40.

The first component 10 includes a first outer surface 11 and an opposite first inner surface 12. The second component 20 includes a second outer surface 21 and an opposite second inner surface 22. The first and second inner surfaces 12, 22 face each other and are spaced apart from each other by a predetermined distance, as described further hereinafter. The first and second components 10, 20 which are joined together by the fastener device 40 are each preferably made of a rigid material. The first component includes a first aperture 15 and the second component includes a second aperture 25. The apertures 15, 25 are preferably coaxially aligned with each other in the assembled condition as shown in FIG. 2. However, due to tolerance variations in the components 10, 20, the first and second apertures 15, 25 may also be partially coaxially misaligned with each other when they are assembled by the fastener device 40, as shown in FIG. 3.

The fastener device 40 includes an axially extending, upper first shaft portion 42 which is integrally molded of a relatively rigid material, preferably being a high impact nylon. The first shaft portion 42 has an upper first tapered head 44 to enable easy insertion of the fastener device 40 within the first aperture 15 of the first component 10. The first shaft portion 42 also includes a planar first base portion 46 extending radially outward from an end of the first shaft portion 42 opposite the first tapered head 44. The first shaft portion 42 includes a plurality of radially outwardly extending thin first fin portions 48 for flexibly engaging the first component 10 upon insertion through the first aperture 15. The first base portion 46 includes a first inner base surface 50 facing away from the first shaft portion 42 and an opposite first outer base surface 52 facing towards the first fin portions 48.

The fastener device 40 also includes an axially extending, lower second shaft portion 43 which is integrally molded of a relatively rigid material, preferably being a high impact nylon. The second shaft portion 43 is formed completely separately and independently from the first shaft portion 42. The second shaft portion 42 has a lower second tapered head 45 to enable easy insertion of the fastener device 40 within the second aperture 25 of the second component 20. The second shaft portion 43 also includes a planar second base portion 47 extending radially outward from an end of the second shaft portion 43 opposite the second tapered head 45. The second shaft portion 43 includes a plurality of radially outwardly extending thin second fin portions 49 for flexibly engaging the second component 20 when inserted through the second aperture 25. The second base portion 47 includes a second inner base surface 51 facing away from the second shaft portion 43 and an opposite second outer base surface 53 facing towards the second fin portions 49. The first and second shaft portions 42, 43 are each preferably injection molded of a relatively stiff plastic or nylon material.

The first and second shaft portions 42, 43 each have axially reduced first and second waist portions 54, 55, respectively, positioned between the respective first and second fin portions 48, 49 and base portions 46, 47. When the fastener device 40 is assembled to the first and second components 10, 20, the first waist portion 54 is positioned within the first aperture 15 and the second waist portion 55 is positioned within the second aperture 25.

Preferably, the first and second base portions 46, 47 have generally cylindrical shapes and are wider than the first and second apertures 15, 25. Thus, the first outer base surface 52 engages the first inner surface 12 of the first component 10 when the first shaft portion 42 is inserted therethrough and acts as a stop surface to position the first shaft portion 42 relative to the first component 10. Similarly, the second outer base surface 53 engages the second inner surface 22 of the second component 20 when the second shaft portion 43 is inserted therethrough and acts as a stop surface to position the second shaft portion 43 relative to the second component 20. Thus, it will be appreciated that the first and second tapered heads 44, 45 and the first and second base portions 46, 47 make it easy to assemble the two components 10, 20 together even when the operation is done in a blind assembly condition where the first and second apertures 15, 25 cannot be viewed during assembly.

The fastener device 40 further includes a central connector portion 60 which is preferably molded of an elastomeric material, such as natural rubber, and which is made of a different material which is less stiff than the material forming the first and second shaft portions 42, 43. Preferably, the connector portion 60 is made of an elastomeric material having a durometer of about 20–50 shore A, with a durometer of about 40 shore A being preferred for damping and isolation characteristics. However these durometer ranges are merely exemplary and it is only preferred that the connector portion 60 be made of a material which is less stiff and more flexible than the material of the first and second shaft portions 42, 43. The connector portion 60 is preferably sufficiently flexible to permit axial movement of the first and second shaft portions 42, 43 relative to each other and to provide damping and noise and vibration isolation between the two components 10, 20. Also preferably, the material of the connector portion 60 is sufficiently flexible to permit transverse movement of the first and second shaft portions 42, 43 relative to each other. As shown in FIG. 2, it will be appreciated that the first and second shaft portions 42, 43 are preferably coaxially aligned when the connector portion 60 is in an undeformed condition and when the first and second apertures 15, 25 of the first and second components 10, 20 are coaxially aligned in the assembled condition. However, it will also be appreciated that advantageously, the first and second shaft portions 42, 43 may be coaxially misaligned when the connector portion 60 is in a deformed condition as enabled by the flexible material forming the connector portion 60. Thus, the first and second apertures 15, 25 may be coaxially misaligned in the assembled condition as shown in FIG. 3 while being connected by the fastener device 40.

In making the fastener device 40, the first and second shaft portions 42, 43 are first formed completely separately and independently of each other in a separate process, such as by injection molding. Then in a later step, the connector portion 60 is molded between the first and second shaft portions 42, 43 to connect the shaft portions 42, 43 together. More specifically, the connector portion 60 has a first connector surface 62 which engages and is secured to the first inner base surface 50 of the first base portion 46 and the connector portion 60 has a second connector surface 63 which engages and is secured to the second inner base surface 51 of the second base portion 47. Thus, it will be appreciated that the connector portion 60 generally extends between and interconnects the first and second shaft portions 42, 43.

Preferably, the connector portion 60 has a generally cylindrical shape which is approximately the same as the shape of the base portions 46, 47. However, it will be appreciated that the connector portion 60 could having a greater radial width or a lesser radial with than the first and second base portions 46, 47, since the base portions 46, 47 preferably act as the stop surfaces during insertion of the fastener device 40.

It will be appreciated that in the assembled condition, the connector portion 60 serves as a spacer between the two components 10, 20 and the connector portion 60 has a predetermined axial length which predetermines the distance by which the first and second components 10, 20 will be spaced apart in the assembled condition. Also advantageously, the connector portion 60 is made of a less stiff material than the first and second shaft portions 42, 43 such that the connector portion 60 also functions as an isolation device which reduces the transmission of noise and vibration between the first and second components 10, 20 when they are fastened together by the fastener device 40. This is especially important when the fastener device 40 is used to join components in motor vehicles where it is often desirable to isolate and dampen the noise and vibration between two components in the vehicle to prevent the components from reaching their resonant frequencies.

Also advantageously, the connector portion 60 is relatively flexible and allows for some transverse movement or coaxial misalignment between the first shaft portion 42 and the second shaft portion 43. As shown in FIG. 3, when the first and second apertures 15, 25 of the first and second components 10, 20 are slightly coaxially misaligned, the flexible connector portion 60 permits the first and second shaft portions 42, 43 to also be slightly coaxially misaligned to allow secure connection of the first and second components 10, 20 while also taking up some tolerance variations between the components 10, 20. Also advantageously, the first and second outer base surfaces 52, 53 engage the first and second inner surfaces 12, 22 of the first and second components 10, 20 in the assembled condition and act as stop surfaces while also providing a smooth surface against which the first and second inner surfaces 12, 22 of the first and second components 10, 20 can slide during coaxial misalignment.

It will be understood that a person skilled in the art may make modifications to the preferred embodiment shown herein within the scope and intent of the claims. Although the connector portion 60 is shown as being cylindrical, it will be appreciated that the connector portion 60 could be a variety of geometries as long as it extends between and interconnects the first and second shaft portions 42, 43 and is made of different material which is less stiff than the first and second shaft portions 42, 43. It will further be appreciated that the connector portion 60 could have some material removed to form web portions allowing greater transverse movement between the first and second shaft portions 42, 43 to permit assembly with greater coaxial misalignment of the first and second apertures 15, 25 in the assembled condition.

While the present invention has been described as carried out in a specific embodiment thereof, it is not intended to be limited thereby but is intended to cover the invention broadly within the scope and spirit of the claims.

What is claimed is:

1. A fastener device for connecting a first component having a first aperture therein to a second component having a second aperture therein, the fastener device comprising:

separately formed first and second shaft portions each including means for snap-fitted connection within the first and second apertures of the first and second components, the shaft portions each including a tapered end and an opposite end having a radially outwardly projecting base portion, the base portions of the first and second shaft portions being axially spaced apart from each other; and a central connector portion extending between and interconnecting the base portions of the first and second shaft portions, the first and second shaft portions, including the integrally formed base portions, each being made of a first material and the connector portion being made of a second material, the second material being less rigid than the first material whereby the connector portion interconnects and spaces apart the first and second shaft portions and provides isolation between the first and second components joined together by the first and second shaft portions.

2. The fastener device of claim 1 wherein the first material is nylon and wherein the second material is rubber.

3. The fastener device of claim 1 wherein the second material is rubber having a durometer of about 30–50 shore A.

4. The fastener device of claim 1 wherein the first and second shaft portions each include a plurality of radially outwardly extending thin fin portions for snap-fitted engagement with the first and second apertures of the first and second components.

* * * * *